(12) United States Patent
Roth

(10) Patent No.: US 8,882,045 B2
(45) Date of Patent: Nov. 11, 2014

(54) COVERING DEVICE AND AIRCRAFT AREA COMPRISING A COVERING DEVICE

(71) Applicant: Airbus Operations GmbH, Hamburg (DE)

(72) Inventor: Ingo Roth, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 75 days.

(21) Appl. No.: 13/708,282

(22) Filed: Dec. 7, 2012

(65) Prior Publication Data

US 2013/0168496 A1 Jul. 4, 2013

Related U.S. Application Data

(60) Provisional application No. 61/568,669, filed on Dec. 9, 2011.

(30) Foreign Application Priority Data

Dec. 9, 2011 (DE) .......................... 10 2011 120 762

(51) Int. Cl.
  *B64C 1/06* (2006.01)
  *B64C 1/00* (2006.01)
  *B64D 11/04* (2006.01)
(52) U.S. Cl.
  CPC .. *B64C 1/00* (2013.01); *B64D 11/04* (2013.01)
  USPC ...................................................... 244/131
(58) Field of Classification Search
  USPC ............... 244/130–132, 129.1; 277/345, 590, 277/652, 637, 644; 52/396.04, 395, 459; 403/331

See application file for complete search history.

(56) References Cited

U.S. PATENT DOCUMENTS

| 5,014,934 | A | * | 5/1991 | McClaflin | ..................... 244/132 |
| 5,269,624 | A | | 12/1993 | Kramer | |
| 5,365,713 | A | * | 11/1994 | Nicholas et al. | ............. 52/573.1 |
| 5,827,598 | A | * | 10/1998 | Larsen et al. | ................. 428/131 |
| 7,478,781 | B2 | * | 1/2009 | Granzeier et al. | ............ 244/131 |
| 7,658,044 | B2 | * | 2/2010 | Roth | ......................... 52/396.04 |
| 8,439,597 | B2 | * | 5/2013 | Diamond | ........................ 404/54 |
| 8,544,176 | B2 | * | 10/2013 | Delort | ........................ 29/897.32 |
| 2010/0176242 | A1 | | 7/2010 | Bock | |

FOREIGN PATENT DOCUMENTS

| DE | 10 2004 049 893 | 4/2006 |
| DE | 10 2007 013 904 | 9/2008 |

OTHER PUBLICATIONS

German Office Action dated Jun. 24, 2013.

* cited by examiner

*Primary Examiner* — Philip J Bonzell
(74) *Attorney, Agent, or Firm* — Dickinson Wright PLLC

(57) ABSTRACT

A covering device includes a sealing element and a rib structure which is disposed on a surface of the sealing element. The rib structure includes a plurality of ribs which extend parallel to the surface of the sealing element, wherein the bendability of the ribs parallel to the surface of the sealing element is high, and perpendicular to the surface of the sealing element is low.

13 Claims, 3 Drawing Sheets

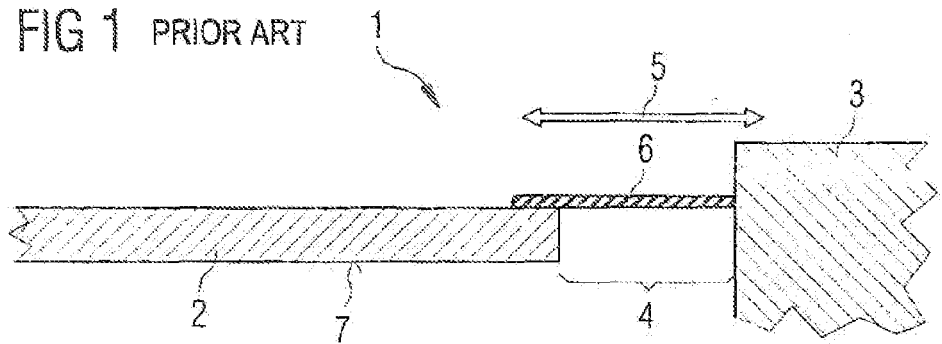
FIG 1 PRIOR ART
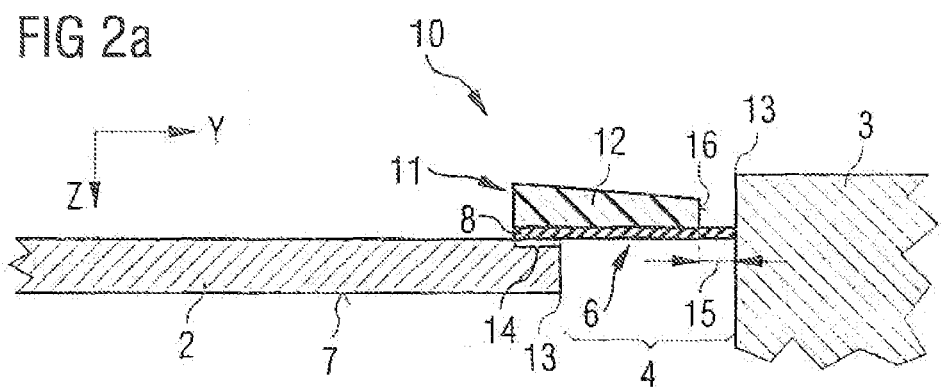
FIG 2a
FIG 2b

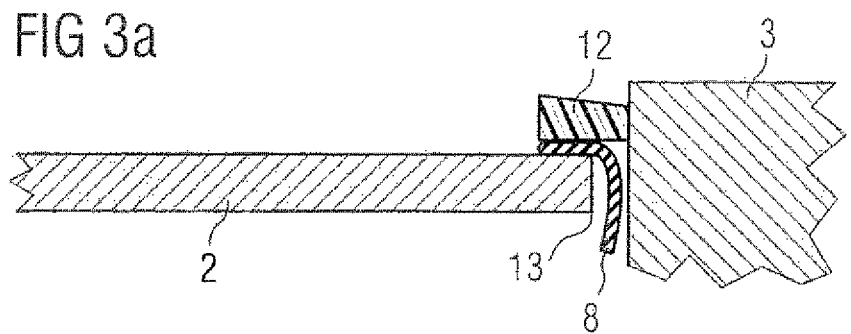
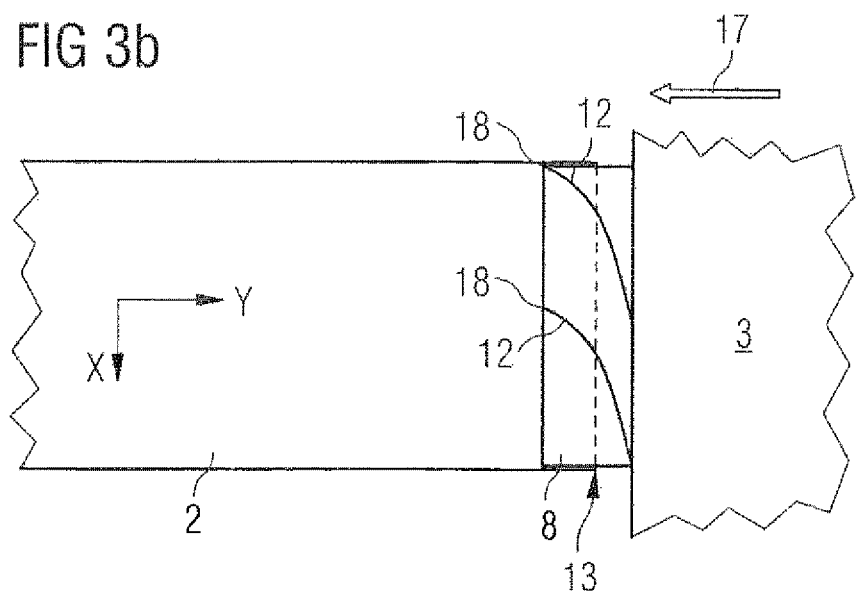

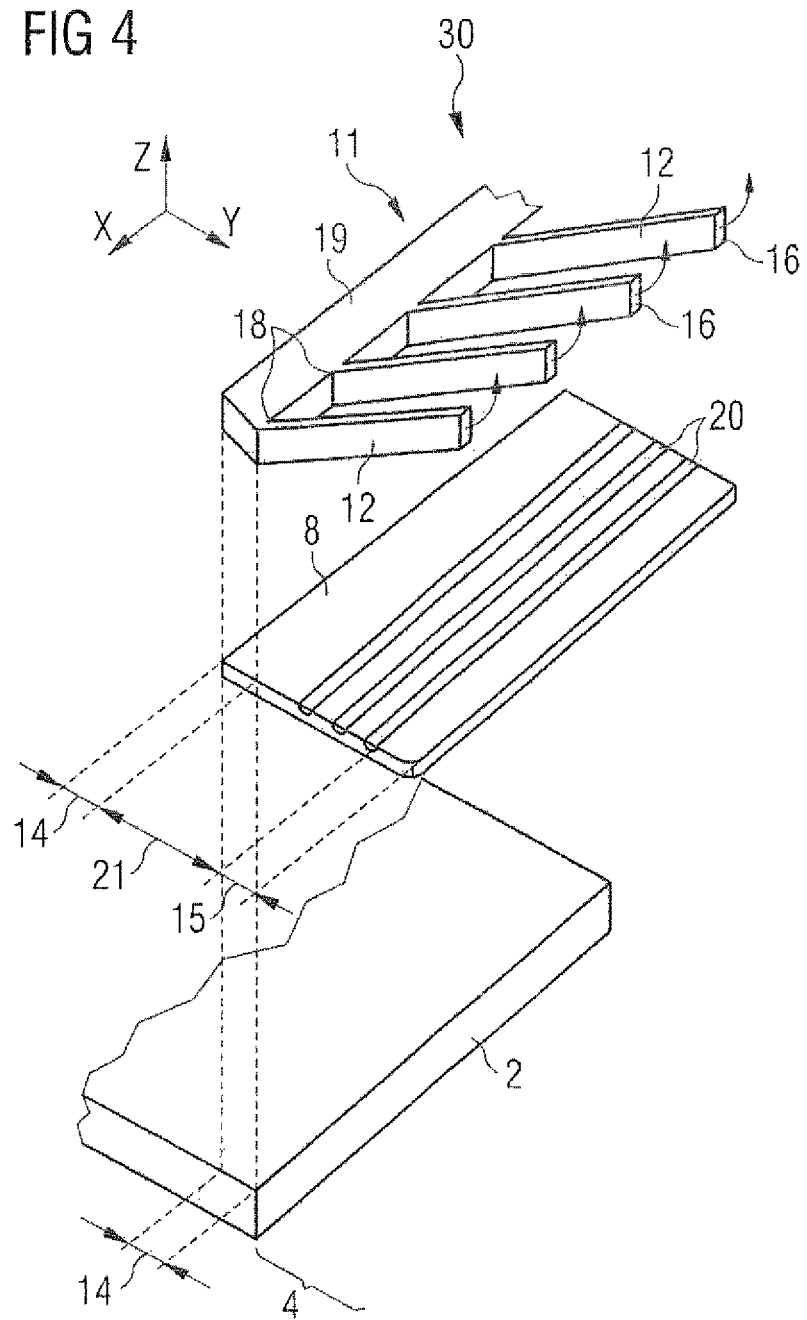

COVERING DEVICE AND AIRCRAFT AREA COMPRISING A COVERING DEVICE

CROSS REFERENCE TO RELATED APPLICATION

This application is entitled to and claims priority of U.S. 61/568,669 filed Dec. 9, 2011 and DE 10 2011 120 762.0 filed Dec. 9, 2011, the disclosures of each of which, including the specification, drawings and abstract, are incorporated herein by reference in their entirety.

FIELD

The invention relates to a covering device and to an aircraft area which contains a covering device.

BACKGROUND

In aircraft, relative movements of greater or lesser magnitude, depending upon aerodynamic environmental conditions, occur between the individual components of the aircraft during flight, such as, for example, relative movements between the aerofoils of the aircraft and its fuselage. Relative movements of this kind continue into the interior of the aircraft cabin, where they cause corresponding relative movements between individual components of the cabin such as, for example, relative movements between monuments and panels.

FIG. 1 shows an aircraft area 1 which has a first component 2 and a second component 3. The first component 2 may be, for example, a panel, and the second component 3 a monument. A gap 4 is provided between the first component 2 and the second component 3 in order to prevent said first component 2 colliding with said second component 3 in the event of relative movements, indicated by the arrow 5, between the former and the latter, and a transmission of force thus taking place between the two components and damaging them.

However, the provision of the gap 4 has the disadvantage that dirt can get behind the first component 2 through the gap 4, or passengers can conceal objects behind said first component 2 (on a rear side 7 of the first component 2) by passing them through the gap 4. In order to prevent this, the gap 4 is covered with a covering device 6. Gap coverings which are suitable for use in aircraft are known, for example, from DE 10 2004 049 893 B4, U.S. Pat. No. 7,478,781 B2 or DE 10 2007 013 904 A1.

If the covering device 6 is manufactured from flexible material (for example as a rubber sealing element), a major relative movement between the first component 2 and the second component 3 is possible, however penetration or perforation or subsequent pressing-down of the covering device 6 into the gap 4 by a passenger can be prevented only with difficulty, as a result of which it is possible for said passenger to conceal objects behind the first component 2 in spite of the covering device 6. If, on the other hand, said covering device 6 is manufactured from a hard material in order to prevent this, the relative movement between the first component 2 and the second component 3 is, in turn, impaired.

SUMMARY

The underlying object of the invention is to make available a covering device and an aircraft area by means of which the disadvantages described above can be avoided.

In order to achieve this object, the invention makes available a covering device comprising a sealing element; and a rib structure which is disposed on a surface of the sealing element, wherein the rib structure comprises a plurality of ribs which extend parallel to the surface of the sealing element, and wherein the bendability of the ribs parallel to the surface of the sealing element is high, and perpendicular to the surface of the sealing element is low. The invention also makes available an aircraft area comprising a first component; a second component which is separated from the first component by a gap; and a covering device as described above, wherein the covering device is fitted at the gap between the first component and the second component in such a way that it at least partially covers said gap. Advantageous configurations or further developments of the concept of the invention are found in the subclaims.

According to one embodiment of the invention, a covering device is made available which comprises a sealing element and a rib structure, wherein said rib structure is disposed on a surface of the sealing element. The rib structure comprises a plurality of ribs which extend parallel to the surface of the sealing element, wherein the bendability of the ribs parallel to the surface of the sealing element is high, and perpendicular to the surface of the sealing element is low.

The result of the different degrees of bendability is that the covering device can be easily bent/buckled/compressed in a plane that extends parallel to the surface of the sealing element, but on the other hand, said covering device cannot be bent, or can be bent (in the xy direction) only very slightly, in a second direction (the z direction) which extends perpendicularly to the surface of the sealing element. For example, the sealing element and the ribs may be designed in such a way, and consist of a material of such a kind, that the ribs can be bent to a 5 to 10 times greater extent in a direction parallel to the surface than in a direction perpendicular to the surface.

If, therefore, a covering device of such a kind is used for covering a gap between two components inside an aircraft, the relative movement between the two components may, on the one hand, be made possible in full measure, but at the same time, penetration of the covering device (i.e. perforation or bending of said covering device perpendicularly to the surface of the sealing element) by a passenger, in order to pass objects through the gap, is prevented.

According to one embodiment of the invention, at least some of the ribs belonging to the rib structure extend parallel to one another. In addition, the ribs that extend parallel to one another may be spaced apart equidistantly from one another. This has the advantage of providing uniform flexibility/bendability of the covering device.

According to one embodiment of the invention, the ribs belonging to the rib structure each have first ends and also second ends that lie opposite said first ends. The first ends as well as the second ends may be of "free-standing" construction or at least partially connected to other elements of the rib structure. For example, the first ends of the ribs may be connected to a common transverse element of the rib structure in such a way that said rib structure has, as a whole, a comb-shaped formation. In this form of embodiment, the part of the ribs which is not connected to the transverse element of the rib structure (i.e., in particular, the second ends of the ribs) may be bendable relative to said transverse element of the rib structure.

The sealing element may, for example, be manufactured from a rubbery-elastic material or from a plastic which can be processed by injection moulding and which has suitable rubbery-elastic properties. The sealing element may also be manufactured from a continuous rubber mat, a continuous plastic film or a continuous plastic mat, or may consist, at least partially, of a plastic film or plastic mat. In particular, the sealing element may consist of a material which has a Shore hardness of 30 to 50. The ribs, on the other hand, preferably consist of a plastic material, particularly of a plastic which can be processed by injection moulding. It is also conceivably possible to produce the ribs from a fibre composite material, in particular a glass-fibre-reinforced plastic material. In the event of the ribs being produced from a fibre composite material, the reinforcing fibres incorporated are preferably constructed as short fibres. Materials of this kind permit the production of ribs which have greater hardness and greater stiffness than the sealing element, but are nevertheless sufficiently elastic to allow said ribs to bend in a direction parallel to the surface of the sealing element.

According to one embodiment of the invention, a part of the sealing element projects beyond the second ends of the ribs. An advantage of a covering device of this kind is that the part of the sealing element that projects beyond the second ends of the ribs is very easily bendable in a direction (the z direction) which extends perpendicularly to the surface of said sealing element (i.e. perpendicularly to the face along which the ribs extend). What is provided in this way is a covering device which has regions of differing bendability, namely a first region with ribs and low bendability and a second region without ribs and with high bendability: If, for example, the covering device is used for covering a gap between two components, only a part of the sealing element of the covering device, which part projects above the second ends of the ribs, is bent (perpendicularly to the face along which the ribs extend) in a first stage in which the two components move only slightly relative to one another. Since the said part is easily bendable, only very slight resistance is directed against the relative movement.

In a second stage, in which the relative movement of the components is increased in relation to one another, a part of the sealing element of the covering device is additionally bent (perpendicularly to the face along which the ribs extend), which part is located underneath the ribs, but is not fixedly connected to the latter, when the covering device is in the "rest state" (no relative movement). In addition, the ribs are bent in a plane in which they extend, i.e. the face which is covered by the ribs is buckled/reduced. Because of the lower bendability of the ribs, compared with the high bendability of the sealing element, an increased resistance is thereby directed against the relative movement.

There may be disposed in the sealing element reinforcing elements whose stiffness is greater than that of said sealing element and which are disposed in such a way that bending of the sealing element perpendicularly to its surface is made more difficult. The reinforcing elements may, for example, be embedded in the form of strip-shaped elements in a rubbery-elastic material or a plastic film/plastic mat. Furthermore, the reinforcing elements may be disposed in such a way that (in a rest state in which no relative movements occur) they extend perpendicularly to the longitudinal orientation of the ribs.

The reinforcing elements incorporated in the sealing element may consist of a material which has greater hardness and higher stiffness than the material used to produce the sealing element. In particular, it is possible to conceive of reinforcing elements made of a plastic material or a fibre composite material, in particular a glass-fibre-reinforced plastic material. If the reinforcing elements are produced from a fibre composite material, the reinforcing fibres incorporated are preferably constructed as short fibres. In one particularly preferred form of embodiment, the sealing element comprising the incorporated reinforcing elements can be produced by a two-component injection-moulding process or by co-extrusion. Moreover, the sealing element may have a shape which is adapted to the desired degree of bending of said element. In particular, the sealing element may be arched in a manner corresponding to the desired degree of bending, i.e. in the direction of said desired degree of bending. This makes it possible to prevent the sealing element from bending in an unwanted manner.

The invention also makes available an aircraft area which comprises a first component and a second component which are separated from one another by a gap. Said aircraft area comprises a covering device according to the invention, which is fitted at the gap between the first component and the second component in such a way that it at least partially covers said gap.

The first component may be, for example, a panel, and the second component a monument.

According to one embodiment of the invention, the ribs of the rib structure may extend along straight lines which intersect at least one edge, of opposite edges of the gap that extend parallel to one another, at an angle which is not equal to 90°. For example, an angle of about 30 to 60°, in particular about 40 to 50°, and particularly preferably about 45° may be chosen. The angle may be chosen in dependence upon the desired degree of bendability of the ribs. A disposition of the ribs at an angle of about 45° makes possible a satisfactory compromise between the desired degree of bendability of the ribs parallel to the surface of the sealing element and the desired reinforcing or stiffening action of said ribs, perpendicularly to the surface of the sealing element.

BRIEF DESCRIPTION OF THE DRAWINGS

The invention will be explained in greater detail below, in an exemplary embodiment, with reference to the figures, in which:

FIG. 1 shows a diagrammatic cross-sectional representation of an aircraft area in a conventional form of embodiment;

FIG. 2a shows a diagrammatic cross-sectional representation of an aircraft area according to one form of embodiment of the invention, in a first condition;

FIG. 2b shows a diagrammatic top view of the aircraft area shown in FIG. 2a;

FIG. 3a shows a diagrammatic cross-sectional representation of the aircraft area shown in FIG. 2a, in a second condition;

FIG. 3b shows a diagrammatic top view of the aircraft area shown in FIG. 3a; and FIG. 4 shows a diagrammatic exploded representation in perspective of a covering device according to one form of embodiment of the invention.

DETAILED DESCRIPTION OF EMBODIMENTS

In the figures, components, areas of components or groups of components which are identical or which correspond to one another are identified by the same reference numerals. It should also be mentioned that the drawings are of a diagrammatic nature, i.e. do not need to be true to scale.

FIGS. 2a and 2b show an aircraft area 10 according to one form of embodiment of the invention. The aircraft area 10 corresponds, in its make-up, to the aircraft area 1 shown in FIG. 1, the difference being that the covering device comprises a sealing element 8 and a rib structure 11, said rib structure 11 being disposed on said sealing element 8. The sealing element 8 consists of a rubbery-elastic material or a plastic with suitable rubbery-elastic properties and has a Shore hardness of 30 to 50. The rib structure 11 consists of a plastic material, particularly of an injection-moulded plastic material, such as polyamide for example, which has a greater hardness and a higher stiffness than the material of the sealing element 8. However, the material of the rib structure 11 must have a certain degree of elasticity in order to be able to achieve the bending, which will be described below, of the rib structure 11 parallel to the surface of the sealing element 8, without damaging the latter or the rib structure 11.

As can be inferred from FIG. 2*b*, the rib structure 11 comprises a plurality of ribs 12 which extend parallel to one another. Said ribs have first ends 18 and second ends 16. The straight lines along which the ribs 12 extend intersect edges 13 of the gap 4 at an angle α which is ≠90°. The angle α may be chosen, for example, in dependence upon a desired bending resistance which the ribs 12 direct against the second component 3 in the event of movement relative to the first component 2. The smaller the chosen angle α, the lower the resistance the rib structure 11 directs against a relative movement between the first component 2 and the second component 3. The angle α preferably amounts to about 45°.

The ribs 12 belonging to the rib structure 11 may be fastened on the sealing element 8 in an area 14, for example using an adhesive. Similarly, the sealing element 8 may be fastened to the first component 2 in an area 14, for example using an adhesive. Outside the area 14, the ribs 12 belonging to the rib structure 11 are not fixedly connected to the sealing element 8, so that said sealing element 8 can be bent downwards (the z direction), away from the ribs 12; see FIGS. 3*a* and 3*b*.

In one advantageous form of embodiment, a width of an area 15 of a part of the sealing element 8 that projects beyond the second ends 16 of the ribs 12 amounts to about 1 cm. Since the relative movements between the first component 2 and the second component 3 during normal flights are, in most cases, smaller than 1 cm, this has the advantage that only low resistance is directed against the relative movement between the first component 2 and the second component 3; on the other hand, the width of the area 15 (i.e. that area of the covering device which is not masked by the ribs 12) is still so small that a passenger cannot, in spite of the absence of ribs, pass an object of any appreciable size through the gap 4, i.e. penetrate the covering device 6. More generally, it may be stated that the area 15 should be only large enough to be able to absorb just the "normal" (fairly small) relative movements.

FIGS. 3*a* and 3*b* show the aircraft area 10 shown in FIG. 2*a* in a condition which comes about after the second component 3 has moved towards the first component 2, as is indicated by the arrow 17. As can be inferred from FIGS. 3*a* and 3*b*, a part of the sealing element 8 is deflected/curled downwards (in the z direction) in this case. At the same time, the ribs 12 are bent in a direction perpendicular thereto (the x-direction which extends parallel to the surface of the first component 2), as is also indicated by the arrows 25 shown in FIG. 2*b*. As can be inferred from FIGS. 3*a* and 3*b*, the complete part, that projects beyond the second ends 16 of the ribs 12, of the sealing element 8 (the area 15), as well as almost the entire part of an area 21 so of the sealing element 8 (that area of said sealing element 8 which lies underneath the ribs 12 but is not fixedly connected to the latter) is deflected/curled downwards. If the width of the area 15 amounts to 1 cm, the width of the area 21 may typically amount to 1 cm-2.5 cm.

Ribs 12, which have a height (measured perpendicularly to the surface of the sealing element 8) of about 5 mm and a width (measured parallel to the surface of said sealing element 8) of about 1 mm, can thus be bent, parallel to the surface of the sealing element, by about 1 to 2.5 cm, while their bendability perpendicularly to the surface of said sealing element 8 is limited to 1 to 2 mm. However, these deformations of the ribs 12 only occur in exceptional cases, i.e. when major relative movements of the components 2, 3 occur, for example in the event of intense turbulence or the like. Under normal flying conditions, on the other hand, the relative movement of the components 2, 3 is limited to the area 15. This has the advantage that the ribs 12 are not exposed to any sustained loading. It is therefore merely necessary for the ribs 12 to be designed taking into account the maximal loading that acts upon them.

Although this is not explicitly shown in FIGS. 2 and 3, the first ends 18 of the ribs 12 may be connected to one another by a transverse element of the rib structure, so that said rib structure 11 as a whole has a comb-shaped formation, such as is shown in FIG. 4 for example.

FIG. 4 shows a further form of embodiment of a covering device 30 belonging to the invention, in an exploded representation. The rib structure 11 of the covering device 30 comprises ribs 12, the first ends 18 of which are connected to one another by a transverse element of said rib structure. In this form of embodiment, the ribs are disposed parallel to, and equidistantly from, one another and extend in the xy plane. The transverse element 19 of the rib structure likewise extends in the xy plane, but perpendicularly to the longitudinal direction of the ribs 12. Underneath the rib structure 11, there is disposed a sealing element 8 which may consist, for example, of a flexible plastic material. In this form of embodiment, there are let into the sealing element 8 rectilinear reinforcing elements 20, the stiffness of which is greater than that of said sealing element 8 and which are disposed in such a way that bending of the reinforcing elements within the xz plane is prevented or at least made difficult. However, the reinforcing elements 20 may be "displaced"/curled downwards (the z-direction) as a whole like a roller shutter, while retaining their rectilinear shape. The provision of the reinforcing elements 20 has the advantage that these form a grid, together with the ribs 12, which makes it additionally difficult to penetrate the covering device 30. Nevertheless, the sealing element 8 can be satisfactorily deflected/curled downwards (the z direction). In this form of embodiment, the second ends 16 terminate flush with one edge 22 of an outer reinforcing element 20, but this is not a requirement.

The rib structure 11 is mounted, together with the sealing element 8, on the first component 2 (for example a panel) by means of bonding or screwing, for example, within the area 14. In the event of a relative movement between the first component 2 and a second component 3, in a first stage (slight relative movement) only that area of the sealing element 8 which is identified by the reference numeral 15 is deflected/curled downwards (the z direction), under which circumstances the ribs 12 belonging to the rib structure 11 do not bend. In a second stage (major relative movement) that part of the sealing element 8 which is identified by the reference numeral 21 is additionally deflected/curled downwards (in the z direction), and at the same time the ribs 12 are bent in the xy plane, i.e. the second ends 16 are moved within the xy plane, but the first ends 18 of the ribs 12 are securely fixed in position with respect to the xy direction.

The invention claimed is:
1. Covering device comprising:
a sealing element in the form of a flat sheet of flexible material; and
a rib structure which is disposed on a surface of the sealing element, wherein the rib structure comprises a plurality of ribs which extend parallel to the surface of the sealing element from a first end to a second end, wherein the first ends of the ribs are connected to the sealing element in a first area of the surface and the second ends of the ribs are not fixedly connected to the sealing element, and wherein the bendability of the ribs parallel to the surface of the sealing element is higher than the bendability of the ribs perpendicular to the surface of the sealing element.

2. Covering device according to claim 1, wherein at least some of the ribs extend parallel to one another.

3. Covering device according to either of claim 1, wherein first ends of the ribs are each connected to a transverse element of the rib structure in such a way that said rib structure has, as a whole, a comb-shaped formation.

4. Covering device according to claim 1, wherein the sealing element comprises a plastic film or plastic mat or comprises areas of plastic film.

5. Covering device according to claim 1, wherein there are provided, in or on the sealing element, reinforcing elements, the stiffness of which is greater than that of said sealing element and which are disposed in such a way that bending of the sealing element perpendicularly to the surface of said sealing element is made difficult.

6. Covering device according to claim 1, wherein a part of the sealing element projects beyond the second ends of the ribs.

7. Covering device according to claim 6, wherein that part of the sealing element which projects beyond the second ends of the ribs is bendable perpendicularly to the surface of the remaining part of the sealing element.

8. Covering device according to claim 6, wherein the sealing element projects approximately 1 cm beyond the second ends of the ribs.

9. Aircraft area comprising:

a first component;

a second component which is separated from the first component by a gap; and a covering device the covering device comprising:

a sealing element; and a rib structure which is disposed on a surface of the sealing element, wherein the rib structure comprises a plurality of ribs which extend parallel to the surface of the sealing element, and wherein the bendability of the ribs parallel to the surface of the sealing element is higher than the bendability of the ribs perpendicular to the surface of the sealing element, wherein said covering device is connected to the first component and fitted at the gap between the first component and the second component in such a way that it at least partially covers said gap, and wherein the ribs extend between a first end and a second end, and wherein the first ends of the ribs are fastened to the sealing element in a first area of the surface and the second ends of the ribs are not fixedly connected to the sealing element in a second area of the sealing element.

10. Aircraft area according to claim 9, wherein the first component is a panel, and the second component is a monument.

11. Aircraft area according to claim 9, wherein the ribs of the rib structure extend along straight lines which intersect at least one edge, of opposite edges of the gap that extend parallel to one another, at an angle which is not equal to 90°.

12. Aircraft area according to claim 9, wherein the ribs extend at non-orthogonal angle to an edge of the gap at least one of the first and second area.

13. Covering device according to claim 1, wherein the ribs extend at a non-orthogonal angle to an edge of the sealing element adjacent the first area.

* * * * *